United States Patent
Tower

[11] Patent Number: 5,879,048
[45] Date of Patent: Mar. 9, 1999

[54] RESTRAINING NET FOR CAR WINDOW

[75] Inventor: Guy N. Tower, New York, N.Y.

[73] Assignee: Creative Products & Trade, Inc., New York, N.Y.

[21] Appl. No.: 10,070

[22] Filed: Jan. 21, 1998

Related U.S. Application Data

[63] Continuation of Ser. No. 585,587, Jan. 16, 1996, Pat. No. 5,713,624.

[51] Int. Cl.⁶ .......................................................... B60J 1/20
[52] U.S. Cl. .................... 296/152; 280/749; 160/DIG. 2; 160/354; 119/712
[58] Field of Search ........................... 296/152; 280/749; 160/DIG. 2, 354, 369; 119/712

[56] References Cited

U.S. PATENT DOCUMENTS

| | | |
|---|---|---|
| 2,665,754 | 1/1954 | Claussen et al. . |
| 2,717,036 | 9/1955 | Harris . |
| 3,847,201 | 11/1974 | Kalish . |
| 4,406,320 | 9/1983 | Bingham . |
| 4,512,286 | 4/1985 | Rux . |
| 4,758,041 | 7/1988 | Labeur . |
| 4,924,814 | 5/1990 | Beaudet . |
| 4,997,226 | 3/1991 | Grimes . |
| 5,060,361 | 10/1991 | Grimes . |
| 5,290,086 | 3/1994 | Tucker . |
| 5,524,694 | 6/1996 | Arapis . |

FOREIGN PATENT DOCUMENTS 608670  5/1978  U.S.S.R. .

*Primary Examiner*—Joseph D. Pape
*Attorney, Agent, or Firm*—Kenyon & Kenyon

[57] ABSTRACT

A safety restraining net for a car window. The restraining net comprises a net frame, mesh webbing, and one or more attachment devices for attaching the restraining net to the vehicle door. At least one of the attachment devices may be configured for fastening below a hinge of the car door, a latch of the car door, and/or the bottom of the car door. Once installed, a net according the invention allows doors and/or windows to open and close normally.

9 Claims, 4 Drawing Sheets

RESTRAINING NET FOR CAR WINDOW

This application is a continuation of Ser. No. 08/585,587 filed Jan. 16, 1996.

FIELD OF THE INVENTION

The invention is directed generally to a pet safety device, and, more particularly, to a device for reducing the possibility of loss or injury to pets when they travel in passenger cars or trucks, thereby providing drivers with a more secure state of mind and better attention to the road.

BACKGROUND OF THE INVENTION

When traveling with pets, many people allow their pets to stick their heads out of car (or truck) windows, either with the window partially open or, while holding the pet, with the window wide open. Additionally, people often leave their pets in the car unattended, either with the window partially open or completely closed.

In passenger cars with windows partially open, pets risk injury to the head or paws, should automatic windows get activated by mistake. Also should the car suddenly brake, pets might be thrown against the glass of the window.

In passenger cars with windows wide open, pets risk being ejected or could jump out of vehicles. As pets stick their heads out of windows too far out, they could get injured by other vehicles or objects.

In passenger cars with windows closed, pets could suffer from overheating and lack of ventilation.

SUMMARY OF THE INVENTION

It is an object of the invention to provide a novel safety restraining net in the form of mesh netting for a car window, such that pets can enjoy the full benefits of the wind and view, but cannot stick their head or body out of the vehicle. Variations of the inventive restraining net may also be suitable for keeping children safely inside of a vehicle.

A restraining net according to the invention comprises a net frame, mesh webbing, and attachment devices. The net frame may comprise a textile sleeve, appropriately sized to fit the window of a car. Within the area delimited by the net frame, a mesh webbing is constructed, for example made up of horizontal and vertical polyester ropes knotted together at 1¾ inch intervals or any other suitable pattern. The net is attached to the car door by attachment devices, which, for example, may be in the form of ropes or belts with fastening buckles, snaps or hooks.

The invention may also comprise a novel attachment system, in which the attachment devices include a novel mechanism for securing the bottom of the frame of the net. In one embodiment, at least one of the attachment devices is configured for fastening below a hinge and/or a latch of the car door. In another embodiment, at least one of the attachment devices is configured for fastening below the door frame.

Once installed, a net according the invention allows doors and/or windows to open and close normally, while keeping pets safely inside the car.

DETAILED DESCRIPTION OF THE DRAWINGS

Figure 1:
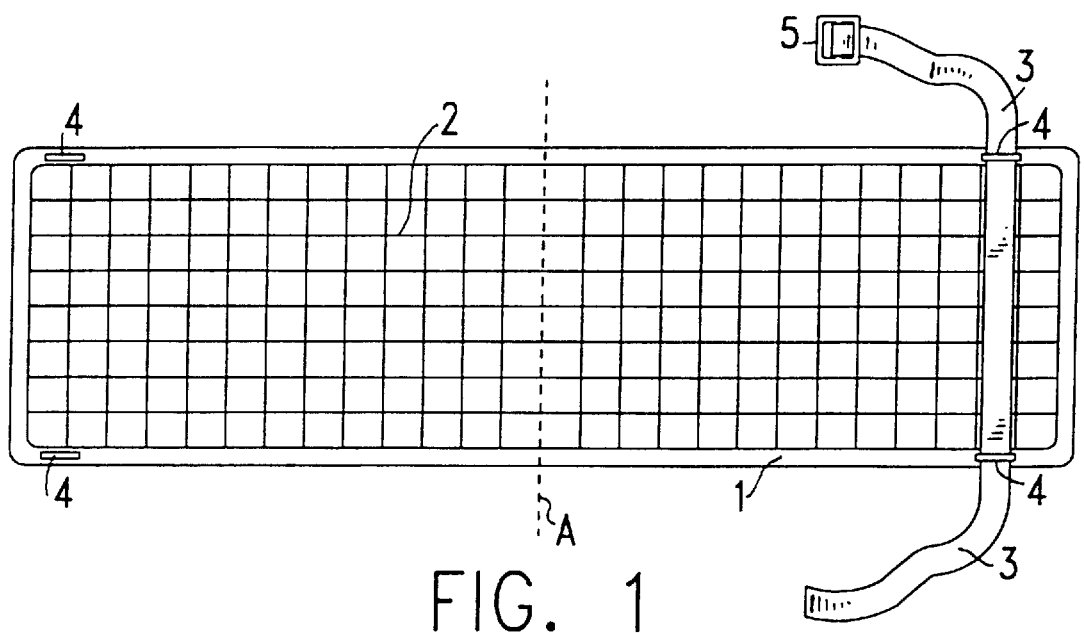
FIGS. 1 and 2 show a first embodiment of a restraining net according to the invention.
Figure 2:
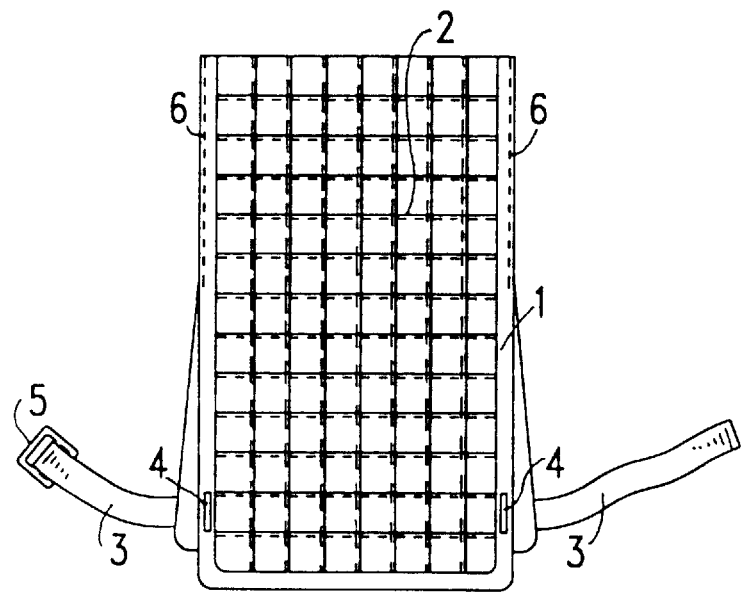

FIGS. 1 and 2 show a first embodiment of a net according to the invention. The net comprises a net frame 1 which may be constructed, for example, of a suitable textile material, mesh webbing 2 which may be constructed, for example, from knotted polyester or nylon ropes in any suitable pattern, and attachment devices which may comprise, for example, belt 3, belt loops 4, and buckle 5.

The net is prepared for installation by folding it along a central axis A shown in FIG. 1 and securing the two halves along part of the length of the net, for example by stitching 6 as shown in FIG. 2. In this manner, the net is constructed in the form of a hood which may be fitted over the door of a car.

Figure 4:
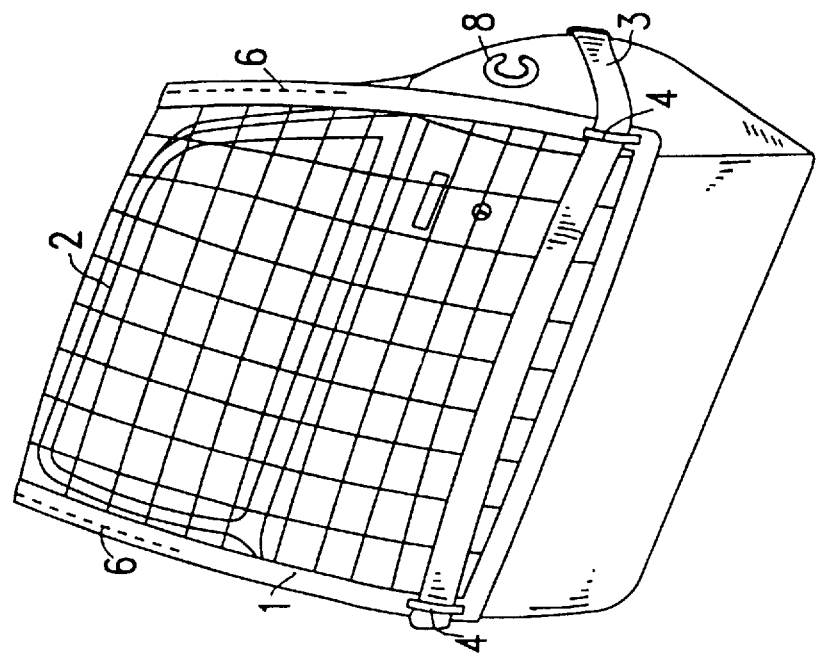
FIGS. 3 and 4 show the restraining net of FIGS. 1 and 2 installed on a car door.
Figure 3:
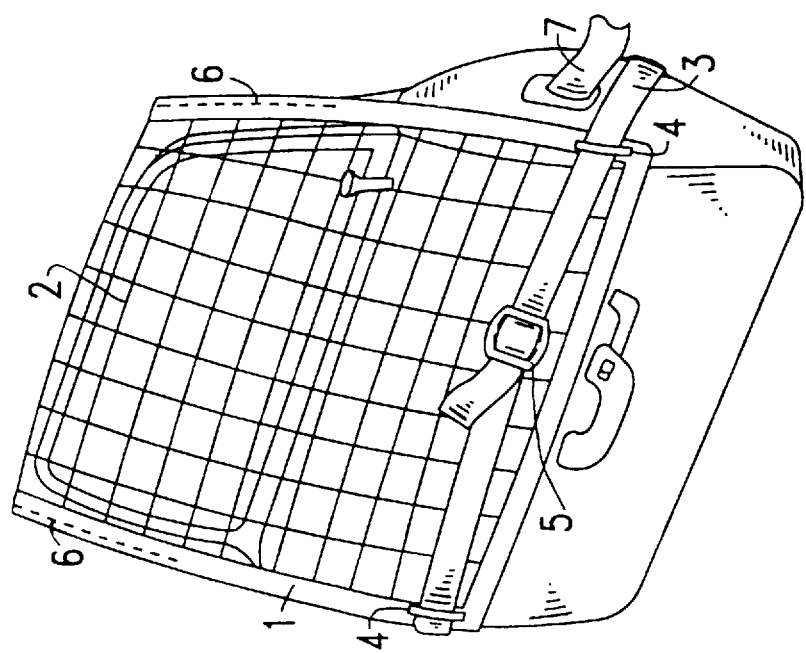

FIGS. 3 and 4 show the net of FIGS. 1 and 2 installed on a car door, with FIG. 3 showing the inside of the car door and FIG. 4 showing the outside of the car door. The net is placed over the window frame of the car door with each of the two halves of the net on opposite sides of the door. At the bottom of the net, the belt 3 is passed around the door through the belt loops 4 and fastened tightly by the buckle 5. As shown in FIG. 3, the belt 3 extends underneath a hinge 7 of the car door, and, as shown in FIG. 4, the belt passes below a latch mechanism 8 of the car door. In this manner, the bottom of the net is held secure once in place.

The attachment devices comprising the belt 3, belt loops 4 and buckle 5 are merely exemplary of attachment devices which may be used within the scope of the invention, as a number of other attachment devices are also possible. For example, two or more belts (ropes, cords, or other suitable devices) could be used in conjunction with other fasteners (such as snaps and/or hooks). In addition, the belt (or belts) could be designed to extend underneath only one of either the hinge 7 or the latch 8.

Figure 5:
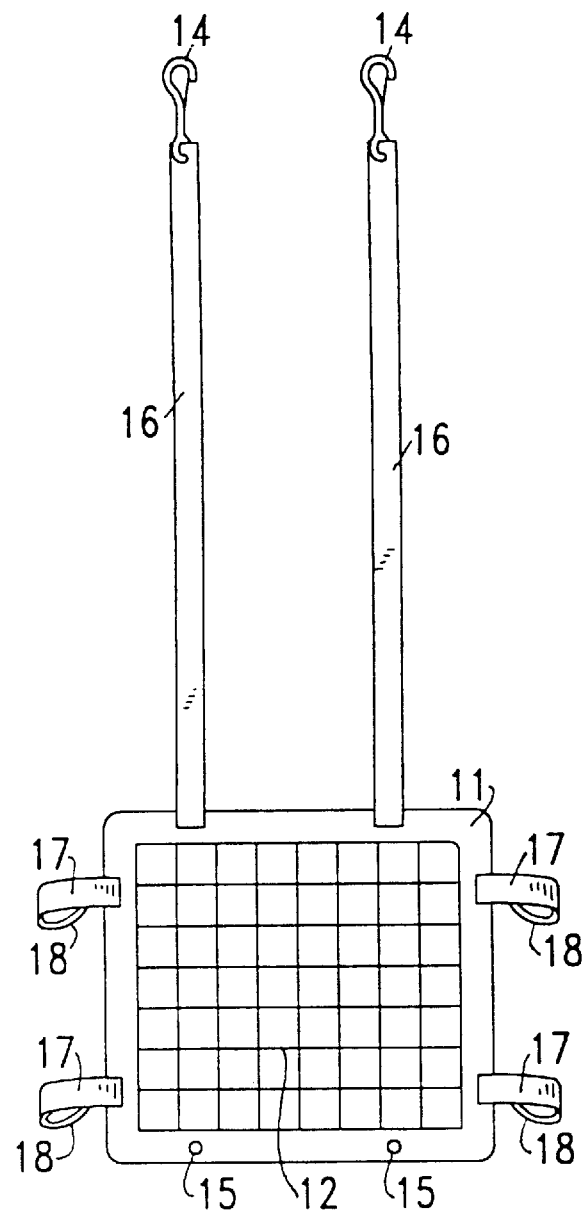
FIG. 5 shows a second embodiment of a restraining net according to the invention.

FIG. 5 shows a second embodiment of a net according to the invention. The net comprises a net frame 11, mesh webbing 12, and attachment devices which may comprise belts 16, 17, hooks 14, and grommets 15. In the illustrated embodiment, two long belts 16 are attached at the top of the net, and two short belts 17 are attached on each of the two sides of the net. The two long belts 16 have hooks 14 at their ends, and two corresponding grommets 15 are located along the bottom of the net. The four short belts 17 have loops 18 on their ends for receiving the long belts 16.

Figure 7:
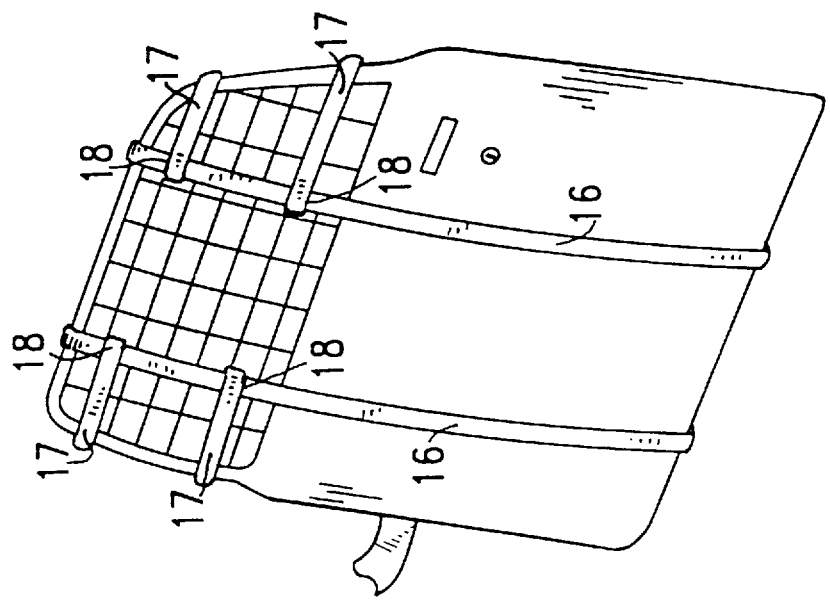
FIGS. 6 and 7 show the restraining net of FIG. 5 installed on a car door.
Figure 6:
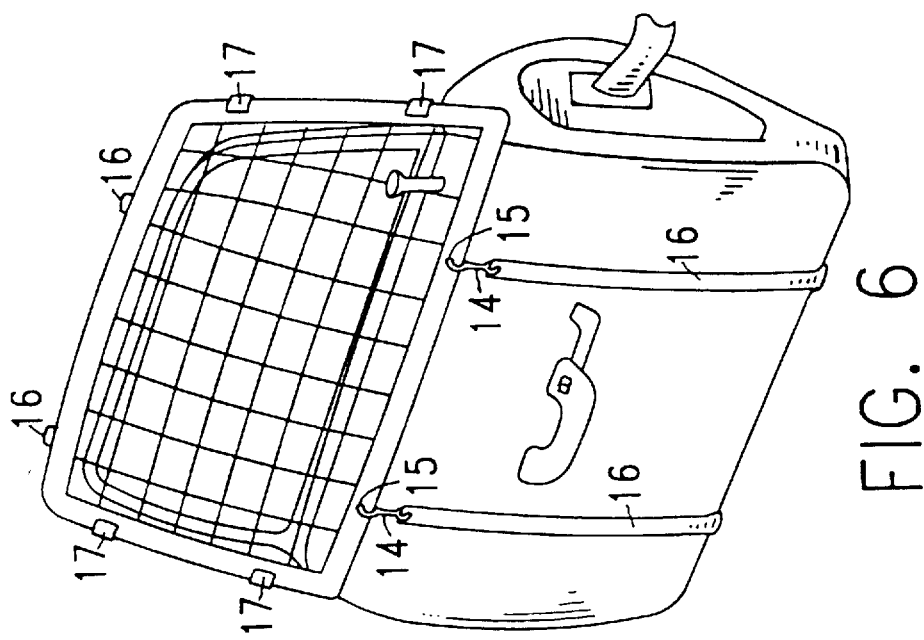

FIGS. 6 and 7 show the net of FIG. 5 installed on a car door. To install the net, the net is first placed on the inside of the car door over the inside of the window frame. Each of the belts 16, 17 is then passed around the frame of the window to the outside, and the long belts 16 are passed through the loops 18 of the short belts 17 on the outside of the car door. The long belts 16 are then passed underneath the door frame to the inside of the door, and the hooks 14 are fastened to the corresponding grommets 15 on the bottom of the net frame. In this manner, as with the first embodiment, the bottom of the net is held secure once in place.

It will be appreciated that with both of the embodiments illustrated and described above, no modifications need to be made to the car. Furthermore, the passenger car door and car window can be opened and/or closed the usual way. The net can remain installed on the car, even if windows are being closed.

The job of installing the net is very simple it requires simply opening the car door, extending the net, and joining simple fasteners together. Removing the net involves the same simple process in reverse. When finally anchored, the net will be safely secured, parallel to the window, offering maximum protection and a safe trip for the pets inside the cars.

It will be appreciated that there are many variations of the disclosed embodiments that are within the scope of the invention, and that the disclosed embodiments do not limit the scope of the invention, which is defined by the appended claims.

What is claimed is:

1. A method of installing a restraining net for a window of a vehicle door, wherein said restraining net comprises a net frame for placing over a window frame of the vehicle door, mesh webbing attached to the net frame and located within the net frame wherein a plurality of access openings are provided in the mesh webbing, wherein the distance across each access opening is about 1¾ inches, and one or more attachment devices, said method comprising the steps of:

placing the restraining net in position over the window frame, said placing step including providing access between the inside of the vehicle and the outside of the vehicle through the openings in the mesh webbing when the window is in an open or partially open position; and securing said one or more attachment devices to attach the restraining net to the vehicle door.

2. A method of installing a restraining net as claimed in claim 1, wherein said net frame and said mesh webbing form a hood, and wherein said placing step comprises placing the hood over the window frame such that the mesh webbing extends on both the inside and the outside of the window frame.

3. A method of installing a restraining net as claimed in claim 1, further comprising the step of extending at least one of said one or more attachment devices such that it extends underneath a portion of the door.

4. A method of installing a restraining net as claimed in claim 3, wherein said portion of the door comprises a hinge, such that said extending step comprises extending at least one of said one or more attachment devices such that it extends underneath a hinge of the door.

5. A method of installing a restraining net as claimed in claim 3, wherein said portion of the door comprises a latch, such that said extending step comprises extending at least one of said one or more attachment devices such that it extends underneath a latch of the door.

6. A method of installing a restraining net as claimed in claim 3, wherein said portion of the door comprises the bottom of the door, such that said extending step comprises extending at least one of said one or more attachment devices such that it extends underneath the bottom of door.

7. A method of installing a restraining net for a window of a vehicle door, wherein said restraining net comprises a net frame for placing over a window frame of the vehicle door, mesh webbing attached to the net frame and located within the net frame, said mesh webbing comprising an inside mesh webbing portion for positioning on the inside of the window frame and an outside mesh webbing portion for positioning on the outside of the window frame, and one or more attachment devices, said method comprising the steps of:

placing the restraining net in position over the window frame, said placing step including providing a plurality of access passageways between openings in the inside mesh webbing and adjacent openings in the outside mesh webbing when the window is in an open or partially open position; and securing said one or more attachment devices to attach the restraining net to the vehicle door.

8. A method of restraining a pet within the inside of a vehicle with an open or partially open window, comprising the steps of:

(a) installing a restraining net over a window frame of the window, wherein said restraining net comprises a net frame for placing over the window frame, mesh webbing attached to the net frame and located within the net frame, and one or more attachment devices, said installing step comprising the steps of:

placing the restraining net in position over the window frame, said placing step including providing access between the inside of the vehicle and the outside of the vehicle through openings in the mesh webbing when the window is in an open or partially open position; and securing said one or more attachment devices to secure the restraining net in position over the window frame; and (b) placing the pet in the inside of the vehicle, wherein the pet in the inside of the vehicle is able to press against the mesh webbing and access air on the outside of the vehicle through the openings in the mesh webbing when the window is in an open or partially open position, and wherein the restraining net keeps the pet inside the vehicle.

9. A method of restraining a pet within the inside of a vehicle with an open or partially open window as claimed in claim 8, wherein said net frame and said mesh webbing form a hood, and wherein said placing step comprises placing the hood over the window frame such that the mesh webbing extends on both the inside and the outside of the window frame.

\* \* \* \* \*